(12) United States Patent
Bugnano et al.

(10) Patent No.: US 9,119,504 B2
(45) Date of Patent: Sep. 1, 2015

(54) DELIVERY ASSEMBLY FOR MACHINES FOR PREPARING LIQUID PRODUCTS VIA CARTRIDGES

(75) Inventors: Luca Bugnano, Moncalieri (IT); Alberto Cabilli, Moncalieri (IT)

(73) Assignee: LUIGI LAVAZZA S.P.A., Torin (IT)

( * ) Notice: Subject to any disclaimer, the term of this patent is extended or adjusted under 35 U.S.C. 154(b) by 100 days.

(21) Appl. No.: 14/116,497

(22) PCT Filed: Jun. 8, 2012

(86) PCT No.: PCT/IB2012/052913
§ 371 (c)(1),
(2), (4) Date: Nov. 8, 2013

(87) PCT Pub. No.: WO2012/168918
PCT Pub. Date: Dec. 13, 2012

(65) Prior Publication Data
US 2014/0141140 A1 May 22, 2014

(30) Foreign Application Priority Data

Jun. 9, 2011 (IT) .................................. TO11A0509

(51) Int. Cl.
*A47J 31/40* (2006.01)
*A47J 31/36* (2006.01)
*A47J 31/30* (2006.01)

(52) U.S. Cl.
CPC ................ *A47J 31/407* (2013.01); *A47J 31/30* (2013.01); *A47J 31/3638* (2013.01)

(58) Field of Classification Search
CPC ............. A23F 2/52; A23F 3/18; A23F 5/262; A47J 31/407
See application file for complete search history.

(56) References Cited

U.S. PATENT DOCUMENTS

| 7,210,401 B1 * | 5/2007 | Rolfes et al. ................ 99/289 R |
| 2012/0207894 A1 * | 8/2012 | Webster et al. ............... 426/433 |

(Continued)

FOREIGN PATENT DOCUMENTS

| EP | 1859713 A1 | 11/2007 |
| EP | 2046170 A | 4/2009 |

(Continued)

OTHER PUBLICATIONS

International Search Report for PCT/IB2012/052913 dated Oct. 25, 2012.

*Primary Examiner* — Anthony Weier
(74) *Attorney, Agent, or Firm* — Heslin Rothenberg Farley & Mesiti P.C.; Victor A. Cardona, Esq.

(57) ABSTRACT

A delivery assembly for a machine for the preparation of liquid products using cartridges includes: an injector device, capable of introducing into the cartridge water and/or steam under pressure, an infusion chamber facing the injector device and capable to receive the cartridge, an actuation system, designed to cause displacements of the infusion chamber between a spaced position and a close position with respect to the injector device, a loading arrangement that includes an inlet passage and retention means, switchable between a retention condition and a release condition of the cartridge by means of displacements of the infusion chamber with respect to the injector device. The delivery assembly further includes ejector means, functionally distinct from the retention means and capable of pushing the cartridge towards the outside of the infusion chamber in function of the displacement of the infusion chamber towards its spaced position from the injector device.

16 Claims, 11 Drawing Sheets

(56) References Cited

U.S. PATENT DOCUMENTS

2013/0068110 A1* 3/2013 Pagano ............................ 99/295
2013/0149424 A1* 6/2013 Fischer ......................... 426/431
2015/0072057 A1* 3/2015 Bugnano et al. ............. 426/431

FOREIGN PATENT DOCUMENTS

| WO | 2006005736 A2 | 1/2006 |
| WO | 2008142663 A2 | 11/2008 |
| WO | 2010032271 A1 | 3/2010 |

* cited by examiner

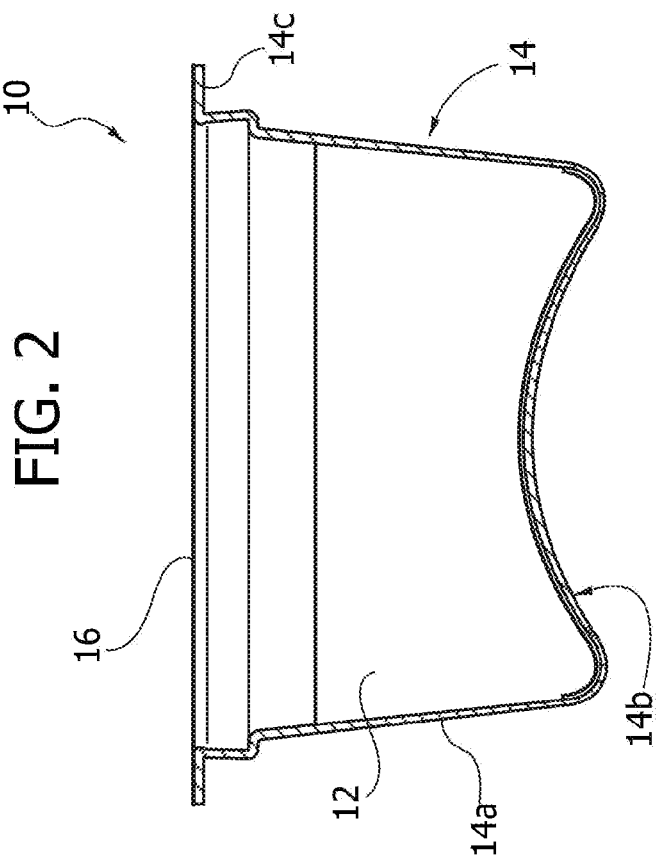
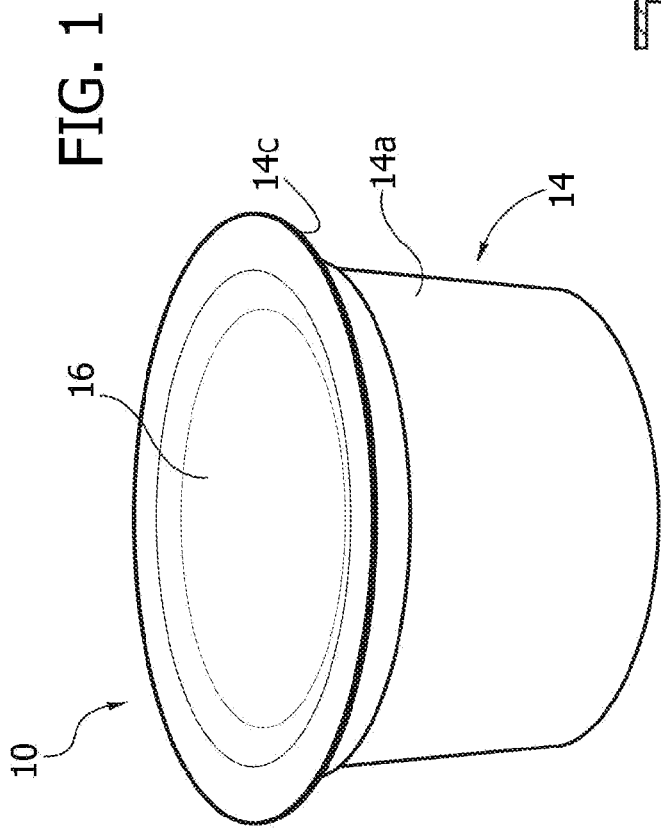

DELIVERY ASSEMBLY FOR MACHINES FOR PREPARING LIQUID PRODUCTS VIA CARTRIDGES

CROSS REFERENCE TO RELATED APPLICATIONS

This application is a 371 National Phase of PCT International Application No. PCT/IB2012/052913 filed on Jun. 8, 2012, and published in English as WO 2012/168918 A1 on Dec. 13, 2012, which claims priority to Italian Patent Application No. TO2011A000509 filed on Jun. 9, 2011, the entire disclosures of which are incorporated herein by reference.

TECHNICAL FIELD

The present description relates to machines for the preparation of liquid products by means of cartridges and has been developed with particular reference to delivery assemblies for said machines.

TECHNOLOGICAL BACKGROUND

WO 2006/005736 describes a machine for the preparation of liquid products having a delivery assembly that includes an injector, for injecting hot water under pressure into a cartridge, and an infusion chamber, for receiving the cartridge and for release of the liquid product, where the injector and the chamber are coaxial to a horizontal axis of the assembly, with the chamber that is movable with respect to the injector. The cartridge is introduced into the delivery assembly from above, by means of a loading arrangement that comprises an upper inlet duct, underneath which means for retention of the cartridge are operative. The aforesaid retention means are constituted by a stationary gripper device, which includes two symmetrically opposite jaws, set transverse to the aforesaid horizontal axis in an area comprised between the chamber and the injector. The jaws are hinged, at the respective upper ends, to pins parallel to the aforesaid axis in order to oscillate between a condition of retention and a condition of release of the cartridge, against the action of elastic means. The jaws are shaped so as to define between them an upper funnel-shaped housing and a substantially cylindrical lower seat, coaxial to the aforesaid axis.

In use, a cartridge is inserted in the inlet duct, until it enters the aforesaid funnel-shaped housing, and then pushed with an energy sufficient to cause divarication of the jaws, with the consequent passage of the cartridge into the underlying cylindrical seat, where the cartridge is withheld by the jaws by means of the action of the corresponding elastic means. Next, the infusion chamber, in the course of its own advance towards the injector, engages the bottom part of the jaws, causing divarication thereof and thus making possible passage of the cartridge within the chamber.

After the step of preparation and dispensing of the liquid product, the chamber moves back towards its initial position so as to enable reclosing of the jaws on the exhausted cartridge. The exhausted cartridge is in this way extracted from the chamber and again withheld between the jaws at the end of cycle. Next, when a user introduces into the inlet duct a new cartridge, the thrust exerted downwards on the latter causes divarication of the jaws, thereby enabling dropping of the exhausted cartridge towards a discharge passage of the assembly.

A substantial disadvantage of the solution known from WO 2006/005736 is represented by the fact that removal from the assembly of an exhausted cartridge implies that in the assembly itself a new cartridge is inserted. The solution hence proves disadvantageous from the hygienic standpoint, in particular when the machine is not used for a certain period of time. Within an exhausted cartridge there remain in fact both the substance used for the infusion and residue of water, which with the passage of time can give rise to bad odours or to moulds.

In order to overcome said drawback, dispensing assemblies have been proposed in which the means for retention of the cartridge are configured for performing also a function of extraction of the exhausted cartridge from the infusion chamber, in the course of a movement of recession between the injector device and the infusion chamber.

For example, EP-A-2046170 describes a delivery assembly in which the infusion chamber can be translated linearly with respect to the injector, and the latter laterally supports two opposite jaws, which are able to assume a closed position and an open position. When the injector is in a position at a distance from the chamber, the jaws are forced elastically into a closed condition in order to be able to receive in a purposely provided seat thereof a peripheral flange of the cartridge, and thus support the cartridge itself. Next, in the course of advance of the chamber towards the injector, a front inclined surface of the jaws interacts with an inclined surface defined in the body of the injector in such a way as to cause divarication of the jaws, and thus disengagement of the cartridge from the aforesaid seat, when the cartridge is already partially introduced into the infusion chamber. After dispensing of the beverage, recession of the infusion chamber with respect to the injector brings about reclosing of the jaws, with a purposely provided extraction portion of said jaws that comes to engage the flange of the cartridge. In this way, in the course of the aforesaid recession, the reclosed jaws determine extraction of the cartridge from the infusion chamber, with the cartridge that can drop by gravity into the discharge passage of the assembly.

Solutions of the same type as the one described in EP-A-2046170, albeit constituting an improvement from the hygienic standpoint as compared to the more traditional known art, are, however, relatively cumbersome and imply—at each dispensing cycle—a significant mechanical interference between the jaws and the injector, with consequent wear of the components and possible misalignments.

WO2010/032271 A discloses a similar delivery assembly wherein extraction of an exhausted capsule from the infusion chamber is obtained with the aid of an additional ejector member. The ejector member essentially consists of a cylindrical hollow body, housed within the chamber so as to slide in an annular seat of the same chamber. Within the same seat a helical spring is provided, which pushes the ejector member towards the outside of the chamber, until a position which is determined by mechanical stops. Also this solution is almost complex and cumbersome, above all in connection with obtainment of the infusion chamber.

EP-A-1859713 also discloses a delivery assembly for use in conjunction with disc-shaped pods made of filter-paper, comprising a pod-holder which is translatable via a transmission including a pair of gears having a non-circular transverse section. The assembly includes an ejector member, slidably mounted in an opening of the bottom wall of the pod-holder, capable of exerting an expulsion force to the pad in order to eject it from the pod-holder. In order to coordinate movement of the ejector member with the movement of the pad-holder, the said member is driven by the gear transmission: to this purpose, the rear end of the ejector member is capable of cooperating with the surface of a toothless stretch of one of the gears of the afore said transmission, to pass from an forward position to a withdrawn position relative to a bottom of the pod-holder, in the course of a movement of approaching of the pod-holder relative to a corresponding stationary injector. During a subsequent reverse movement of the pod-holder, the latter drags the ejector member up to return the rear end thereof in contact with the above said surface. Operability of the ejector member is limited, particularly if—during moving away between the pod-holder and the injector—the pod remains stuck to the injector.

OBJECT AND SUMMARY

In its general terms, the aim of the present invention is to provide an improved and compact delivery assembly that is simple from the constructional and functional standpoint, as well as convenient to use for a user, as compared to the known solutions referred to above.

According to the invention, the aforesaid aim is achieved thanks to a delivery assembly for machines for the preparation of liquid products using cartridges having the characteristics recalled in Claim 1. Advantageous developments of the invention form the subject of the dependent claims. The claims form an integral part of the technical teaching provided herein in relation to the invention.

BRIEF DESCRIPTION OF THE DRAWINGS

The invention will now be described, purely by way of non-limiting example, with reference to the annexed drawings, in which:

FIGS. 1 and 2 are a perspective view and a cross-sectional view, respectively, of a generic sealed cartridge that can be used in a machine for the preparation of liquid products according to the present invention;

DETAILED DESCRIPTION

Figure 3:
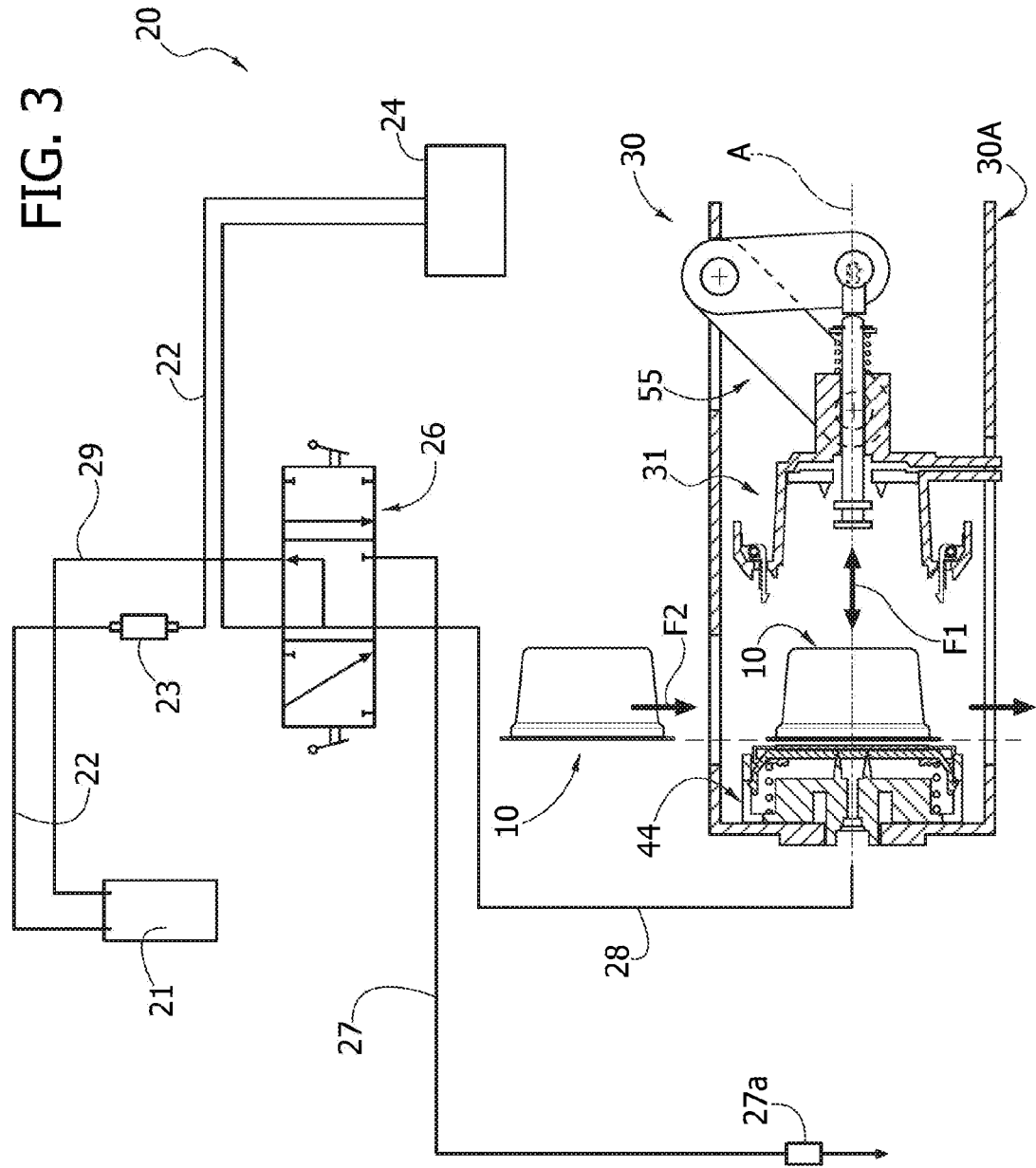
FIG. 3 is a schematic representation, in part in blocks and in part in cross-sectional view, of a possible embodiment of a machine for the preparation of liquid products according to the present invention.

Illustrated in the ensuing description are various specific details aimed at providing an in-depth understanding of the embodiments. The embodiments can be obtained without one or more of the specific details, or with other methods, components, materials, etc. In other cases, structures, materials, or operations that are known by or evident for the person skilled in the sector are not illustrated or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and the like that may be present in various points of the present description do not necessarily refer to one and the same embodiment. Moreover, particular conformations, structures or characteristics may be combined in any adequate way in one or more embodiments.

The references used herein are provided merely for convenience and hence do not define the sphere of protection or the scope of the embodiments.

FIGS. 1 and 2 illustrate, merely by way of example, a cartridge that can be used in a machine according to the present invention. Said cartridge, designated as a whole by 10, is of a type basically known and is described herein merely to facilitate understanding of one embodiment of the present invention.

The cartridge 10 contains a dose 12 of at least one substance that can form a liquid product via water and/or steam. The dose 12 can be constituted by powdered coffee, or by another precursor of a liquid product, such as, for example, a beverage, tea, powdered chocolate, or chocolate in granular form, products for the preparation of broths, soups, drinks and infusions of various nature. Said list is to be understood as merely providing a non-imperative example. In what follows, for simplicity, reference will be made to the preparation of coffee, with the dose 12 that is thus understood as being constituted by powdered coffee.

In the structure of the cartridge 10, which is as a whole shaped substantially like a tray or small cup in which the dose 12 is located, there may be distinguished:

a body 14, comprising a side or peripheral wall 14a and a bottom wall 14b that closes the body 14 at one end of the side wall 14a; and a closing wall 16 that closes the cartridge 10 at the opposite end with respect to the bottom wall 14b.

In the example illustrated, the cartridge 10 is a hermetically closed cartridge, with the wall 16 that is constituted by a sealing lamina. The invention can in any case be used also in combination with cartridges in which the bottom wall and/or the closing wall are previously provided with holes.

In the example, the wall or lamina 16 is connected in a fluid-tight way, for example, by heat sealing, to the side wall 14a of the body 14 of the cartridge, in particular at an outer annular flange 14c thereof, which surrounds the mouth part of the body 14.

In the case exemplified, the body 14 is shaped like a cup or tray diverging from the bottom wall 14b towards the end closed by the sealing lamina 16. Preferably, said diverging conformation is frusto-conical, even though this is not imperative in so far as the cartridge 10 can as a whole be of different shapes, for example, cylindrical, prismatic, frusto-pyramidal, etc.

In the non-limiting example represented, the bottom wall 14b is shaped like a concave vault, with the concavity of said vault directed towards the outside of the cartridge 10. Also in this case, the choice of said conformation is not imperative in so far as the cartridge 10 could have, for example, a bottom wall 14b shaped like a vault with its concavity facing the inside of the cartridge 10, or else a bottom wall 14b that is plane or substantially plane.

Designated as a whole by 20 in FIG. 3 is a machine for the preparation of liquid products that uses a dispensing assembly according to the invention, designed to use a cartridge 10, for example, a cartridge of the type described above with reference to FIGS. 1 and 2.

The machine 20 comprises a reservoir 21 for cold water, with an outlet duct 22, operative on which is a pump 23, of a type in itself known, for example, an electromagnetic pump. Via the duct 22 the reservoir 21 is connected to an inlet of a boiler 24, which is also of a type in itself known. An outlet of the boiler 24 is connected to a duct 25 for supplying hot water and/or steam under pressure to an inlet of a distributor device, for example, a distributor, designated by 26.

When the distributor 26 is in a first operative position (towards the right, as viewed in FIG. 3), it sets the duct 25 in communication with a duct 27 that supplies a nozzle 27a for dispensing hot water and/or steam. When, instead, the distributor 26 is in a second operative position (to the left, as viewed in FIG. 2), the duct 25 is set in fluid communication with a duct 28 for supplying hot water under pressure to a delivery assembly according to the invention, designated as a whole by 30. In various embodiments, the delivery assembly 30 is a horizontal dispensing assembly, which extends as a whole according to a horizontal axis A.

Finally, when the distributor 16 is located in an inoperative position (at the centre, as illustrated in FIG. 3), the duct 25 is in fluid communication with a duct 29 for return of water to the reservoir 21.

Figure 4:
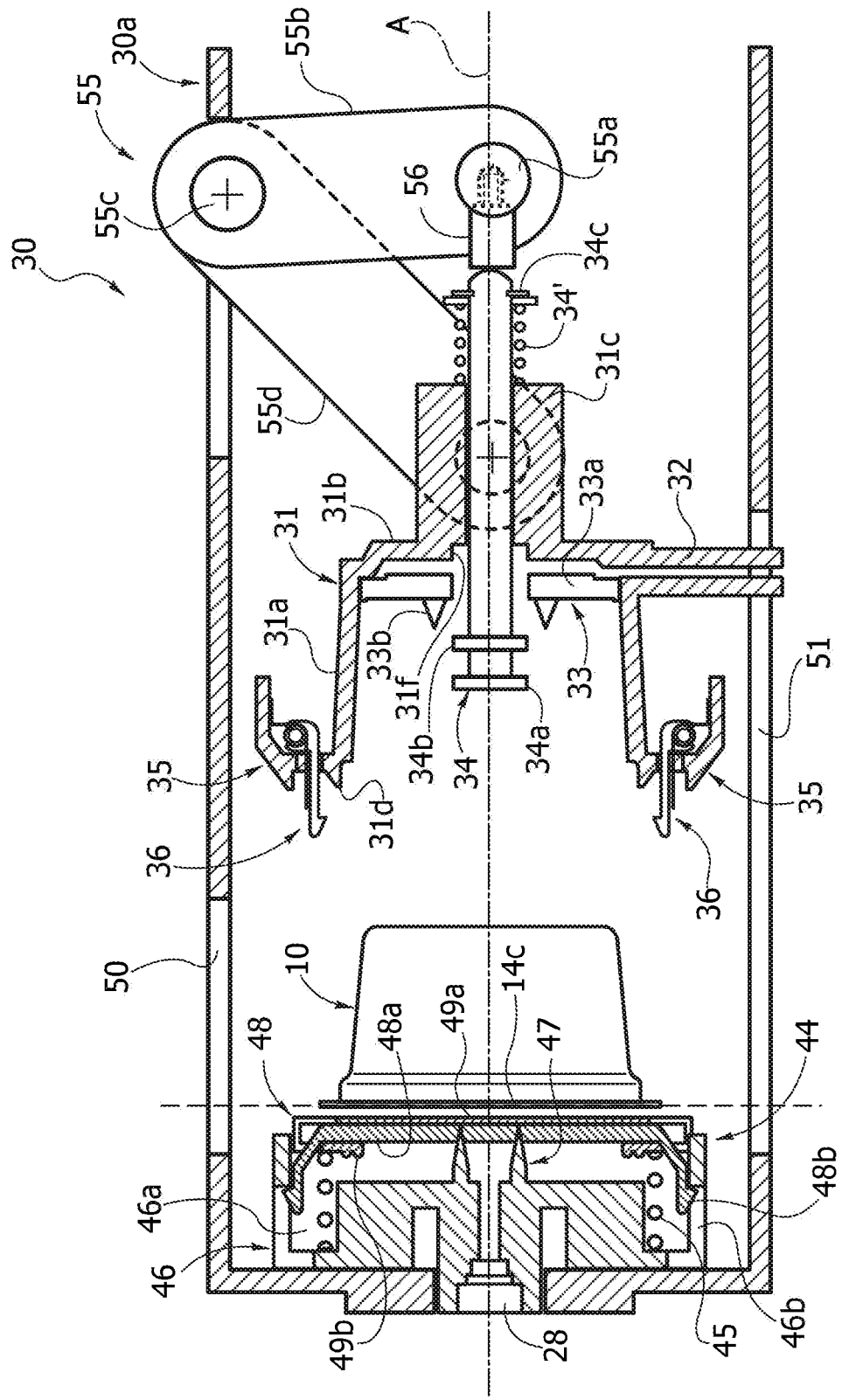
FIGS. 4 and 5 are schematic cross-sectional views, respectively, according to a vertical plane and according to a horizontal plane passing through the axis A of FIG. 4, of a delivery assembly belonging to the machine of FIG. 3, in a condition of loading of a cartridge.

Also with reference to FIG. 4, in various embodiments the delivery assembly 30 has a supporting structure 30a, which in FIGS. 3 and 4 is exemplified in the form of a frame, located in which is an infusion chamber 31, designed to house partially a cartridge 10, and to deliver the liquid product obtained by means of said cartridge, as will emerge hereinafter. The chamber 31, which is substantially coaxial to the axis A, basically consists of a cup-shaped body, in a stationary position with respect to the structure 30a, having a side or peripheral wall 31a, which defines an inner surface of the chamber, which is substantially frusto-conical, or has some other shape congruent with that of the side wall 14a of the cartridges 10 to be used in the machine 20.

The cup-shaped body of the chamber 31 then has a bottom wall 31b and a lateral passage 32 that sets the inside of the chamber in fluid communication with a duct, not represented, for dispensing the liquid product that can be obtained by means of the cartridge 10, i.e., in the example considered here, an infusion of coffee.

In the example represented, associated to the bottom wall 31b is a perforating device 33, internal to the chamber 31, basically comprising a supporting wall 33a, mounted preferably at a distance from the wall 31b, having a central through opening and bearing one or more tips 33b—preferably an array of tips—facing the inside of the chamber 31, in a direction substantially parallel to the axis A. The tips 33b can have a structure provided with one or more axial openings or grooves, which are designed to enable the liquid product prepared using the cartridge 10 to flow out, according to the modalities described more fully in what follows. Irrespective of the specific conformation of the aforesaid tips, the arrangement is such that the liquid that flows away from the cartridge 10, perforated at the bottom by the tips 33b, can reach the chamber defined between the walls 31b and 33a, and then the passage 32. The latter can be connected, for example, via a flexible tube, to a nozzle for dispensing the liquid product. As has been said, on the other hand, the invention can be applied also to the case of dispensing assemblies for cartridges that have a previously perforated bottom wall, in which case it is not necessary to envisage the perforating device 33.

The cup-shaped body of the chamber 31 has a central rear projection 31c, traversed by a passage coaxial to the axis A and opening in the bottom wall 31b of the chamber 31. Slidably mounted in said passage is a preferably cylindrical ejector rod or stem, designated as a whole by 34, which passes also through the aforesaid central opening of the wall 33a of the perforating device 33.

In the example represented, a leading end of the stem 34, which is always within the chamber 31, is provided with cylindrical flanges 34a and 34b that have a diameter smaller than the diameter of the central hole of the supporting wall 33a. The opposite end of the stem 34 is provided with a transverse hole with an anti-extraction pin 34c, which functions also as arrest for the end of a helical spring 34', mounted coaxial on the stem, the opposite end of which encounters the projection 31c. Said spring 34' is operative for biasing the stem 34 towards a refracted position within the chamber 31.

In its mouth part, the chamber 31 is limited by an annular head edge, designated by 31d. As may be seen in FIG. 4, substantially at said edge, branching off from the peripheral wall 31b of the cup-shaped body are two first projections 35, in substantially opposite diametral positions, each of which supports a corresponding coupling member 36, basically of a jaw type. As will emerge hereinafter, the coupling members 36 form part of a system for extracting an exhausted cartridge 10 from the chamber 31, in a step of discharge of the cycle of use of the machine 20.

As may be seen in FIGS. 10-13, each projections 35 has a first radial stretch of wall (not indicated), substantially perpendicular to the axis A, provided with a passage 35a. The radial stretch of wall is followed by a stretch of wall inclined backwards (not indicated) or in any case defining an inclined surface 35b, which is in turn followed by a substantially horizontal stretch of wall 35c. The projections 35 moreover have, in their part generally opposite to the inclined surface 35b, a portion bearing a horizontal pin 37, mounted oscillating on which is the corresponding coupling member 36, which is substantially configured as a lever provided with a tooth 36a at its distal end, said tooth defining an inclined plane or surface facing the axis A. Mounted between the body of the projections 35 and the coupling member 36 is a spring 38, operative for forcing the member itself into a closing position, i.e., towards the axis A. As may be noted, the arrangement is such that a stretch of the coupling member 36 extends through the passage 35a of the projections 35, with the possibility of oscillating about the axis defined by the pin 37, and in such a way that the end provided with the tooth 36a projects beyond the edge 31d of the cup-shaped body.

Figure 5:
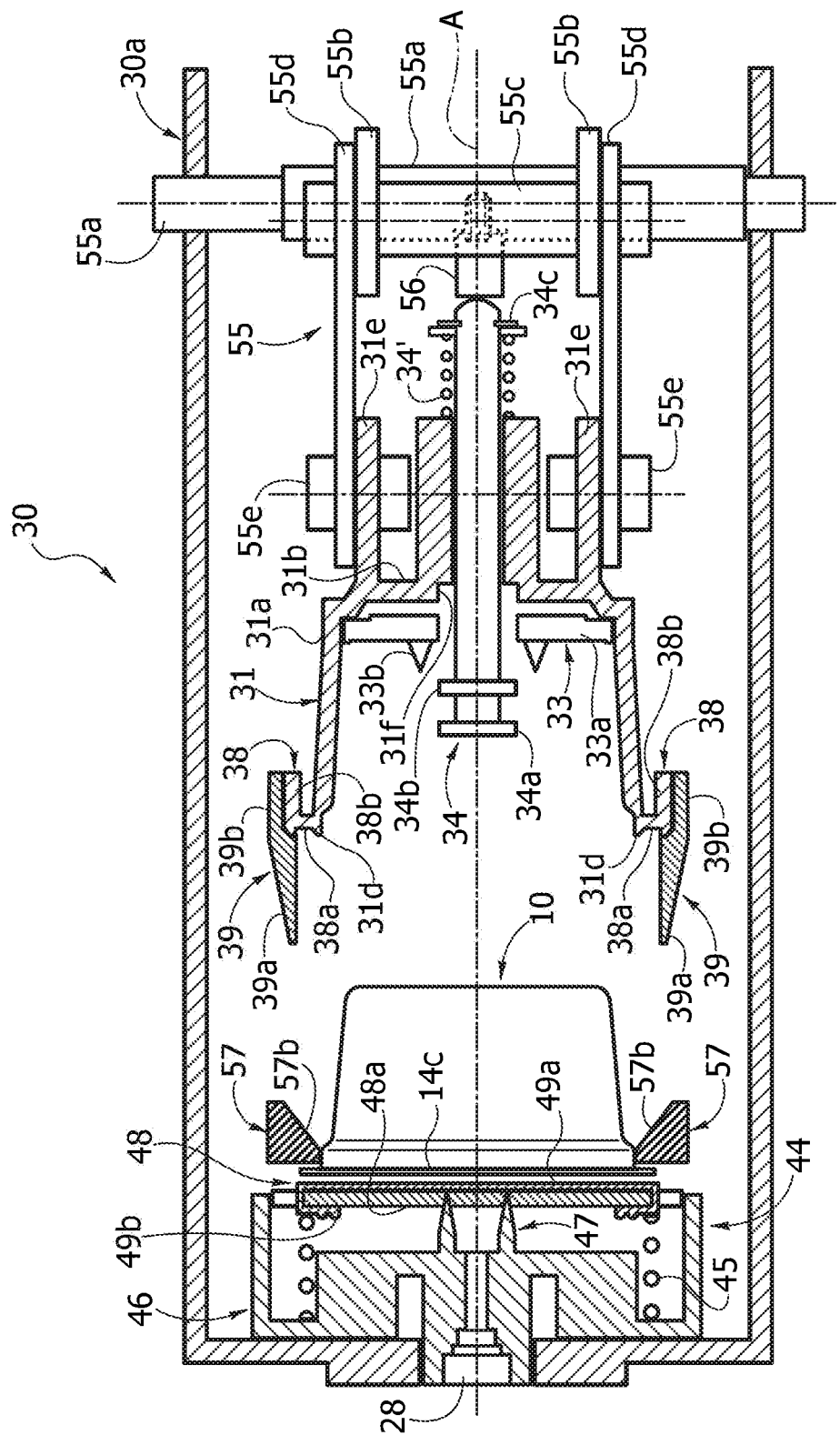

As may be seen in FIG. 5, substantially at the front edge 31d, branching off from the peripheral wall 31b of the cup-shaped body are also two second projections 38, in substantially opposite diametral positions and rotated through approximately 90° with respect to the first projections 35. In the example, each projections 38 has a first radial stretch of wall 38a, substantially perpendicular to the axis A, followed by a substantially horizontal stretch of wall. Rendered fixed with respect to said projections 38 are two divaricator elements 39, in particular wedge-shaped, each of which defines at the front a surface inclined backwards 39a and at the top a plane surface 39b. The front end of the inclined surface 39a projects beyond the edge 31d of the chamber 31 and beyond the leading end of the coupling members 36 illustrated in FIG. 4. It will be appreciated that the wedge-shaped elements 39 may possibly be made of a single piece in the cup-shaped body of the chamber 31.

The delivery assembly 30 further comprises an injector device, designated as a whole by 44 and referred to hereinafter for simplicity as "injector", designed to introduce into a sealed cartridge 10 water and/or steam under pressure, supplied by means of the duct 28 shown in FIG. 3. The injector 44 is substantially coaxial to the axis A and is preferably mounted stationary.

In various embodiments, operatively associated to the injector 44 is a one-way valve (not represented), designed to open only when the pressure inside the duct 28 has reached a given value; such a valve can be integrated within the injector 44 or else be set outside it.

In the example represented (see FIGS. 4 and 5), the injector 44 comprises a generally cylindrical main body 46, having a cavity 46a within which a perforating device 47 is operatively housed. Also the perforating device 47 basically comprises one or more tips—preferably an array of tips—facing the chamber 31 and substantially parallel to the axis A. The tips in question can have a structure provided with at least one axial opening or axial groove in order to enable supply of the pressurized fluid into the cartridge 10 after perforation of the wall 16 (FIGS. 1 and 2). Irrespective of the specific conformation of the body 46 and of the device 47, the arrangement is such that the pressurized fluid that is supplied by means of the duct 28 to the device 47 can penetrate into the cartridge after perforation of the wall 16. As already explained, in any case, the invention can be applied also to the case of dispensing assemblies provided for cartridges that have a closing wall previously perforated, in which case the presence of the perforating device 47 is not necessary.

The cavity 46a is closed at the front by a closing member 48, sharing the axis A, and hereinafter defined for simplicity as "plate". The plate 48 is provided with holes (not indicated) aligned or substantially coaxial to the tips of the perforating device 47, and is slidable towards the inside of the cavity 46a countering the elastic reaction of a spring 45. For this purpose, defined in the injector 44 is a seat for housing one end of the spring 45, the other end of which bears upon the body of the plate 48.

In the embodiment exemplified, the plate 48 has a body substantially shaped like a disk, in particular a lobed disk, having a front wall 48a, provided with the holes for the tips 47a, and rear projections 48b, provided with teeth engaged in corresponding linear guides 46b defined in the peripheral wall of the body 46. The front face of the wall 48 is covered by a sealing element or gasket 49a, which is also provided with holes for the tips of the perforating device 47 and has a peripheral portion that also covers at least part of the outer edge of the wall 48 itself. Provided on the rear face of the wall 48 is an annular gasket 49b, which is designed to provide a seal with respect to a central area of the body 46 (see also FIG. 15). In an advantageous embodiment, the gaskets 49a and 49b are made of a single piece of elastomeric material overmoulded on the body of the plate 48.

The body of the plate 48 is shaped to define two lead-ins or slots, which extend substantially at the outer edge of the wall 48a up to the front face of the latter, said slots being in axial positions corresponding to those of the front coupling members 36 of the chamber 31. Each of said slots defines a respective inclined surface, designated by 48c in FIGS. 10-12. In areas corresponding to the aforesaid front slots of the plate, the gasket 49a is provided with corresponding slits or windows, designated by 49a' once again in FIGS. 10-12.

The rear projections 48b of the plate, in addition to preventing the plate itself from sliding out at the front from the cavity 46a, are preferably sized and positioned in such a way that the front surface of the plate itself is held by the spring 45 (not represented in FIGS. 10-12 for reasons of greater clarity) substantially in a position projecting from the front edge of the main body 46 of the injector 44. In order to enable disassembly of the plate 48 from the main body 46, the projections 48b and the corresponding guides 46b may form part of a bayonet joint.

The dimensions of the plate 48 with the corresponding projections 48b, of the body 46 with the corresponding cavities 46a and guides 46b, as well as of the tips of the perforating device 47, are such that, when at rest, the plate 48 is held by the spring 45 in an advanced position (FIGS. 4-5), where each tip engages, or is substantially coaxial to, a respective hole of the wall and of the front gasket of the plate itself, but without coming out thereof. As will be seen hereinafter, instead, in a position of infusion or preparation of the liquid product, the thrust on the plate 48 exerted by a cartridge 10 causes the perforating device 47 to be in an operative or extracted condition, where its tips project from the holes of the plate 48, following upon recession of the latter towards the inside of the cavity 46a, countering the action of the spring 45.

The displacement of the chamber 31 in the two opposite directions indicated by the arrow F1 of FIG. 3 is obtained by means of an actuation system, designated as a whole by 55. In various embodiments, such as the one exemplified hereinafter, the actuation system 55 comprises a substantially toggle-like mechanism, for example, actuatable manually by a user via a purposely provided lever (not represented).

In the example, the aforesaid mechanism includes a fixed pin 55a, which extends between two opposite sides of the structure 30a perpendicular to the axis A, and rotatably mounted on which are two parallel cranks 55b. The distal ends of the cranks 55b are articulated, by means of a common pin 55c, to the first ends of two connecting rods 55d, the second ends of which are articulated, via respective pins 55e, to respective rear brackets 31e of the body of the chamber 31. By actuating the mechanism—causing, with a manual lever (not illustrated) displacement from above downwards of the axis of rotation constituted by the pin 55c—it is possible to bring about approach of the chamber 31 to the injector 44; then, by displacing the pin 55c from down upwards it is possible to obtain a reverse displacement, i.e., recession of the chamber 31 from the injector 44.

In the embodiment illustrated, there is provided a fixed contrast element for the stem 34, in a position generally behind the chamber 31. In the case exemplified, said contrast element, designated by 56, is mounted on the stationary pin 55a of the mechanism 55.

The machine 20 has a loading arrangement, aimed at enabling guided insertion, from above, of a cartridge 10 into the assembly 30.

The aforesaid loading arrangement includes an upper inlet passage 50, associated to or integral with the structure 30a of the assembly 30, said passage opening substantially in an intermediate area between the chamber 31 and the injector 44. The inlet passage 50 is shaped and has dimensions such as to enable introduction of a cartridge 10 in a direction of loading that is substantially vertical and perpendicular to the axis A (see arrow F2 in FIG. 3), with the corresponding wall 16 facing the injector 34.

On the opposite side with respect to the inlet passage 50, the structure 30a has a lower outlet passage 51, for discharge from the assembly of the cartridge 10 when the latter is exhausted. In a way in itself known, the inlet passage 50 is shaped and has dimensions such as to guide a cartridge 10 with relative precision up to an area of retention, whilst the outlet passage 51 has wider dimensions than the former, to enable the cartridge 10 to drop freely by gravity out of the assembly 30.

The loading arrangement of the delivery assembly 30 is configured to receive the cartridge 10 from above, through the inlet passage 50, and then keep it in a retention position, substantially coaxial to the axis A, between the chamber 31 and the injector 44, with the corresponding closing wall 16 substantially in contact or preferably only slightly spaced apart from the plate 38, i.e., with respect to its front gasket 49a.

For this purpose, the loading arrangement comprises retention means that are able to assume a retention condition and a release condition of a cartridge 10. Preferably, the aforesaid retention means are also configured so as to guide the cartridge up to the aforesaid retention position.

As will emerge clearly hereinafter, switching of the retention means between the aforesaid two conditions is determined by the relative movement between the chamber 31 and the injector device 44. The aforesaid switching between the conditions of retention and of release is determined, in particular, by the mechanical interaction or interference between opposite parts of the chamber 31 and of the retention means themselves.

Figure 6:
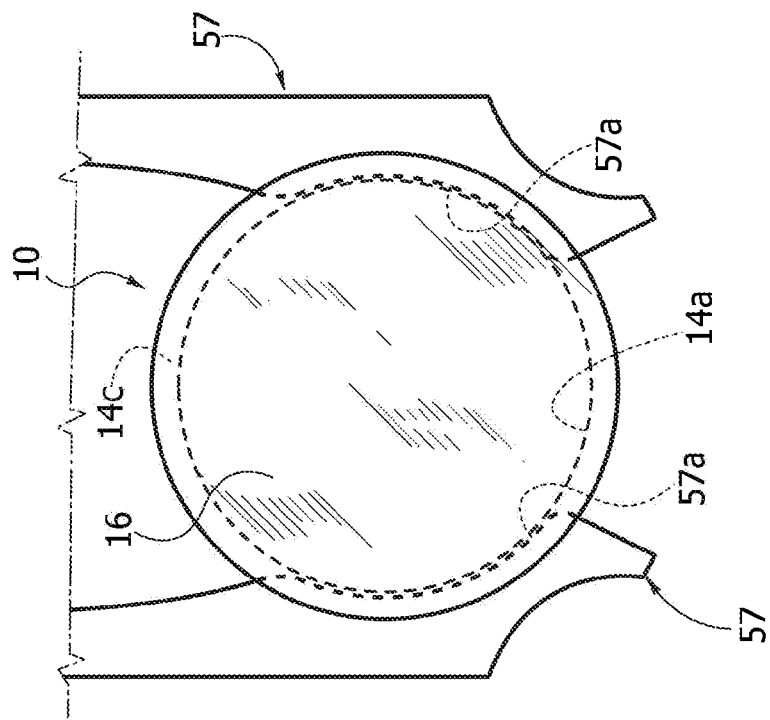
FIG. 6 is a partial and schematic front view of a retention system of a cartridge belonging to the delivery assembly of FIGS. 4 and 5.

With particular reference to FIG. 6, in one embodiment the aforesaid retention and guide means comprise also two lateral jaw elements, designated by 57 and hereinafter defined for simplicity as "jaws". The jaws 57 are set substantially symmetrically on opposite sides of the axis A in one and the same transverse plane. It should be noted that, for greater clarity of representation, the jaws 57 are represented only in some of the attached figures.

In the case exemplified, the arrangement of the jaws 57 is substantially similar to the one described in WO 2006/005736. In said perspective, the jaws 57 extend in length substantially perpendicular to the axis A and are hinged, preferably in an upper region thereof (not represented in FIG. 6) to a respective pin parallel to the axis A, fixed with respect to the structure 30a or to the body 46 of the injector 44. The jaws 57 are provided with springs or similar elastic means (not shown), for example mounted at the corresponding hingepins, prearranged for pushing the jaws themselves towards the retention position, as shown in FIG. 6.

The jaws 57 are shaped so as to define between them a substantially cylindrical lower seat 57a, coaxial to the axis A. The arrangement is such that, in the course of the step of loading from above, a preferably cylindrical part of the cartridge 10, located behind the annular flange 14c (see, for example, FIG. 2), penetrates between the jaws 57, causing divarication thereof against the action of the corresponding springs, until the seat 57a is reached. In this condition, the cartridge 10 is withheld elastically by the jaws 57 (FIG. 6), in a position where it is substantially sharing the axis A, between the injector and the chamber (FIG. 5).

As may be appreciated, for example, in FIG. 5, the body of each jaw 57 defines—in its part facing the chamber 31—an inclined surface 57b; as may be noted in FIG. 5, the inclined surfaces 57b of the two jaws 57 converge in the direction of the injector 44, like the inclined surfaces 39a of the wedge-shaped elements 39.

In use, a sealed cartridge 10 is introduced from above into the inlet duct 50, according to the arrow F2 of FIG. 3 and pushed slightly downwards. Introduction is preferably manual, but may also be obtained by means of an automated mechanism, according to a technique in itself known.

In the loading step, with the actuation system 55 in an initial position (FIGS. 4 and 5), the chamber 31 is in a respective retracted position of loading, i.e., at a distance from the injector 44.

As previously explained, the inlet duct 50 is shaped and sized so as to guide the cartridge 10 with relative precision in its movement downwards. In this way, the cartridge 10 descends to the point where its part located behind the flange 14c penetrates into the seat 57a defined between the jaws themselves, as may be clearly seen in FIG. 6. In this step, the jaws 57 are in fact in the respective closed condition, countering the action of the corresponding springs.

In this way, the cartridge 10 is supported in a position of loading or retention, where the cartridge itself is generally coaxial to the axis A, with the wall 16 close to the front surface of the plate 48, i.e., to its gasket 49a.

The cycle of operation of the machine then envisages operation of the actuation system 55, which brings about progressive advance of the chamber 31 towards the injector 44.

Figure 7:
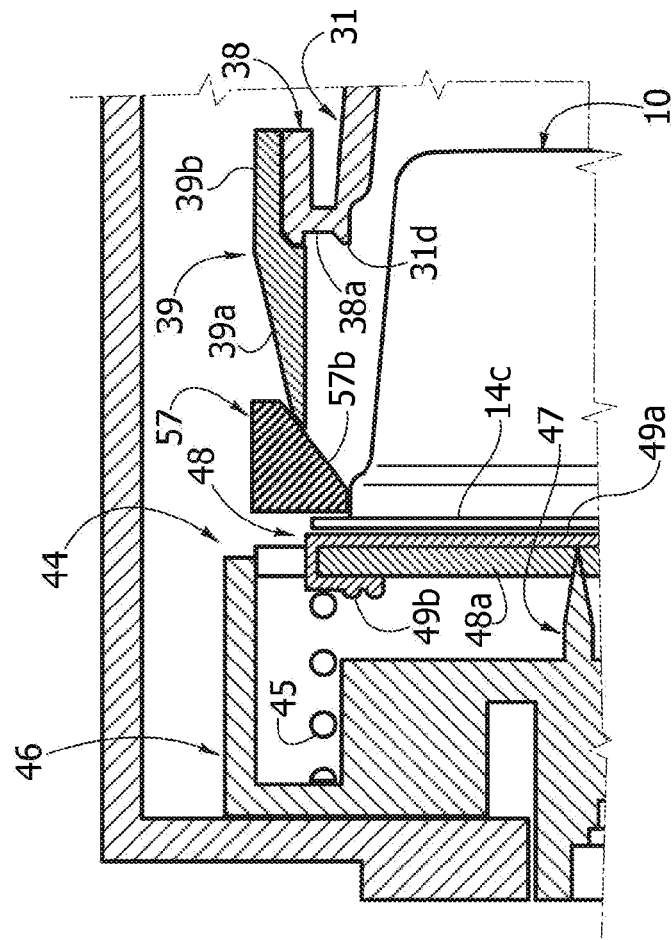
FIGS. 7, 8 and 9 are schematic partial cross-sectional views, at an enlarged scale, aimed at illustrating operation of the first retention system of FIG. 6.

At a certain point of advance of the chamber 31 towards the injector 44, the inclined surface 39a of the wedge-shaped elements 39 come into contact with the inclined surface 57b of the jaws 57, as may be seen in FIG. 7. It should be noted that in this step the cartridge 10 is already introduced into the chamber 31. As the movement proceeds, then, there is brought about progressive divarication or opening of the jaws themselves, against the action of the corresponding springs, and progressive entry of the cartridge 10 into the chamber 31 (see FIG. 8). Since the cartridge 10 is already partially received in the chamber 31 and given the advanced condition of the plate 38, it cannot fall down.

Figure 8:
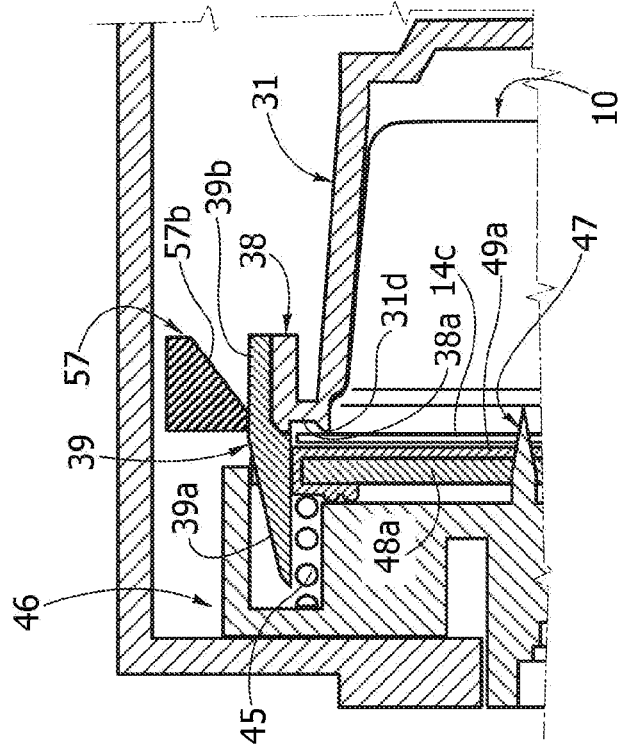

When the inclined surface 39a has passed over the inclined surface 57b entirely, the jaws 57 are in the respective open condition and the plane surface 39b of the wedge-shaped elements 39 can slide on an inner plane surface (i.e., facing the axis A) of the jaws themselves, designated by 57c only in FIG. 8. In this way, in the prosecution of advance of the chamber 31, the jaws 57 are held in the aforesaid open condition, where the cartridge is no longer engaged in the seat 57a of the jaws. In the further advance, the front edge 31d of the chamber 31 comes into contact with the flange 14c so as to push the cartridge 10 forcefully against the plate 38, as may be seen in FIG. 9, with the cartridge that cannot penetrate further into the chamber 31. In this step, the wedge-shaped elements 39 penetrate in purposely provided passages and recesses provided in the body of the injector and of its plate.

Figure 10:
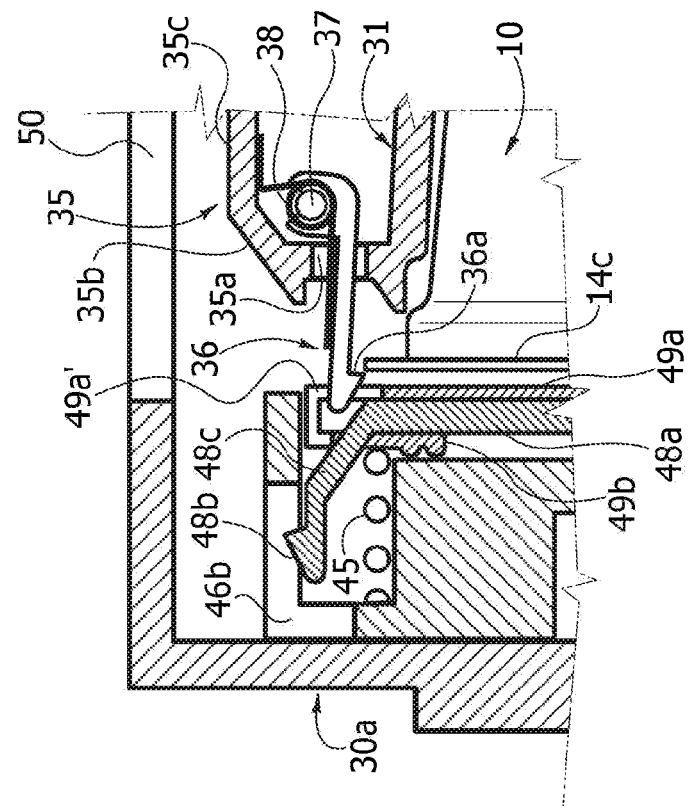
FIGS. 10, 11, 12 and 13 are schematic partial cross-sectional views, at an enlarged scale, aimed at illustrating operation of a system for extraction of a cartridge belonging to the delivery assembly of FIGS. 4 and 5.

Simultaneously with the steps described above, in the course of advance of the chamber 31, the front ends of the two coupling members 36—and in particular the inclined surface of the corresponding teeth 36a—come at a certain point into contact with the annular flange 14c of the cartridge 10, as, for example, appears in FIG. 10. It should be noted that the position and dimensions of the elements involved (the cartridge 10, the chamber 31, the projections 35, the coupling members 36) are such that—at the moment of contact between the coupling members 36 and the flange 14c of the cartridge, the latter is already mostly introduced into the chamber 31, as may be clearly seen in FIGS. 10 and 11. It should likewise be noted that in these steps the conicity of the cartridge 10 and of the chamber 31 brings about a sort of self-centering of the cartridge itself with respect to the chamber and the injector.

Figure 12:
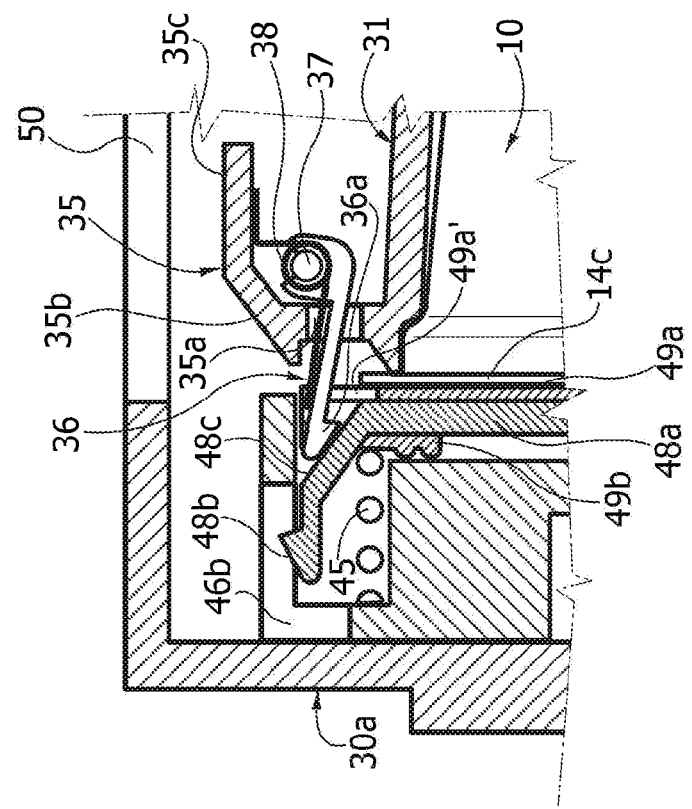

Proceeding with advance of the chamber 31, and after passing altogether beyond the edge of the flange 14c of the cartridge, the inclined surface of the teeth 36a of the coupling members 36 comes into contact with the inclined surface 48c defined in the region at the aforesaid slots of the plate 38, as may be seen in FIG. 12, and then slides thereon up to a final end-of-travel position (visible in FIG. 13), where the front of the cartridge is pushed up against the gasket 49a of the plate 48 by the front edge 31d of the chamber 31. Presence of the inclined surfaces is not indispensable, in that the slots might be replaced by axial grooves or anyway shaped for receiving a respective part of the members 36 which protrudes frontally from the chamber 31 without causing a divarication thereof, after said part has passed beyond the flange 14c.

Figure 11:
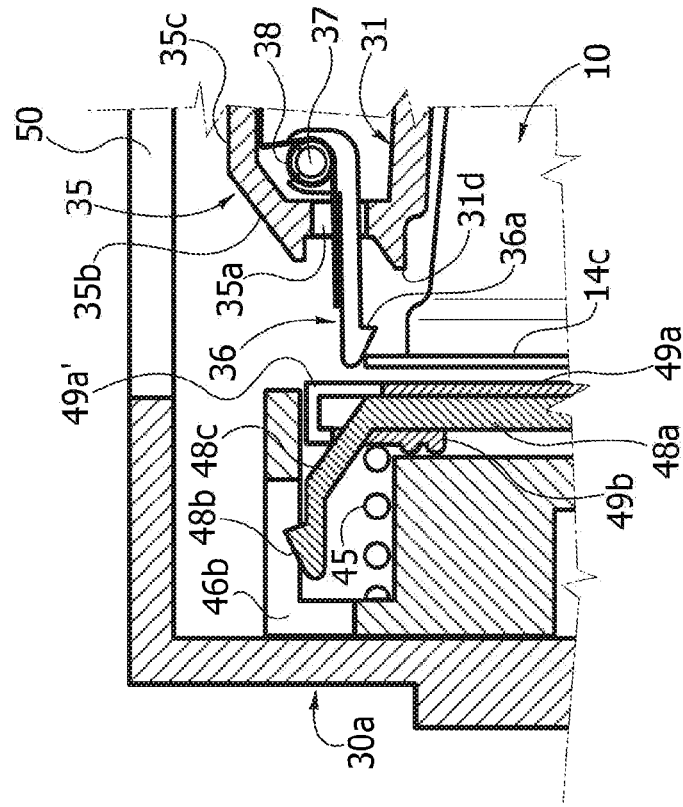

In the case of FIGS. 10-12, the closing wall or lamina of the cartridge 10, i.e., the corresponding flange 14c, is represented slightly moved away from the gasket 49a of the plate in so far as the elastic reaction of the springs 38 of the coupling members 36 is relatively mild. On the other hand, an operation of this sort is performed also in the case of springs 38 designed to develop a greater elastic reaction, in which case the front ends of the members 36 can exert a thrust on the flange 14c, in the sense of pushing the cartridge 10 towards the outside of the chamber 31. However, also in such a case, the cartridge 10 is by now introduced into the chamber 31, without any possibility of it falling forwards outside it, given the proximity thereto of the plate of the injector.

Figure 9:
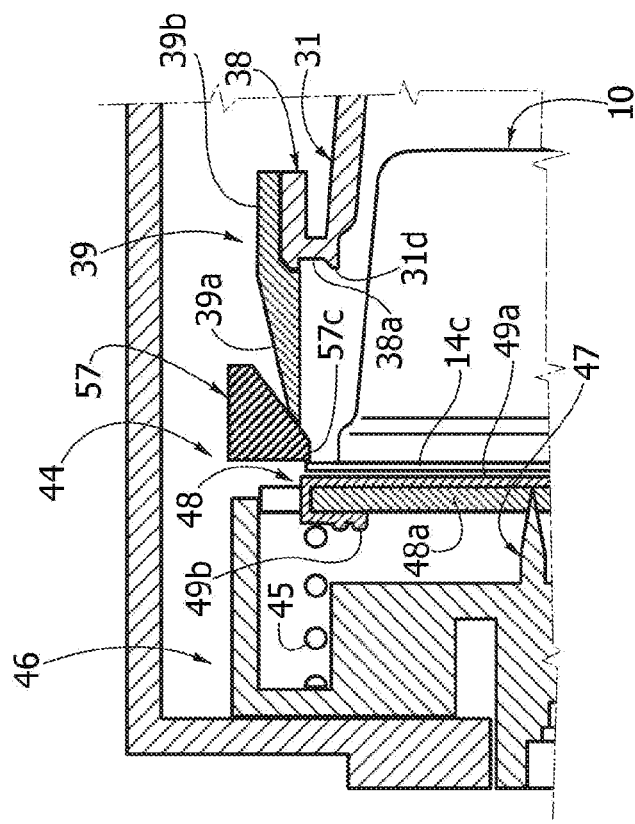
Figure 13:
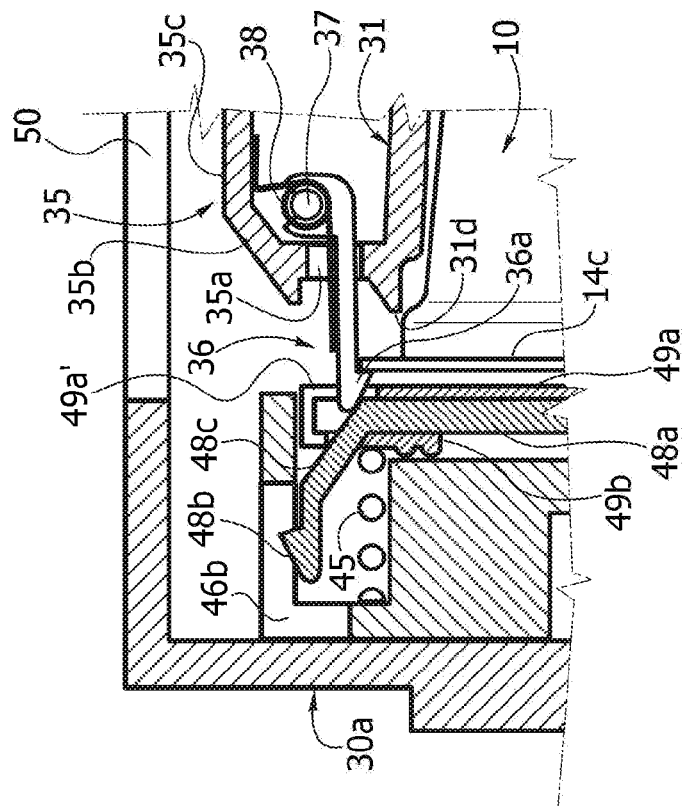

In various embodiments, it may be envisaged that—once the condition represented in FIGS. 9 and 13 is reached—the peripheral region of the bottom wall of the cartridge 10 bears upon a peripheral region of the wall 33a of the first perforating device 33 not provided with tips (for example, in the case of the bottom wall 14c with concavity as represented in FIG. 2) in such a way that the bottom of the cartridge is not initially perforated.

In other embodiments, it is possible to envisage that the bottom wall of the cartridge is set up against the tips 33b of the first perforating device 33, without this causing a substantial perforation or tearing of the bottom, or again that the bottom comes to lie at a short distance from said tips. This can be obtained by appropriately sizing the cup-shaped body of the chamber 31, and in particular the height of its front edge 31d upon which the flange 14c of the cartridge bears. In yet other embodiments, it may again be envisaged that, once the position of arrest of the cartridge 10 within the chamber 31 is reached, the bottom of the former is already perforated by the tips 33b of the first perforating device 33. As has been said, moreover, in the case of an assembly 30 for pre-perforated cartridges, it is not necessary to provide the perforating device 33.

Irrespective of the practical embodiment chosen, as has been said, at a certain point of advance, the cartridge 10 cannot penetrate further into the chamber 31. The chamber 31 continues in any case to advance, and this causes yielding of the spring 45 inside the injector 44, and hence recession of the plate 48 bearing upon the lamina 16 of the cartridge 10. Said recession, and the simultaneous advance of the chamber 31, has as consequence that the tips of the perforating device 47 of the injector 44 comes out of the corresponding holes of the plate 48 and then perforate the lamina of the cartridge, up to a position of maximum advance of the chamber 31 (visible in FIGS. 14 and 15). Once said position is reached, the actuation system 55 has reached the end-of-travel position forwards.

Advance of the chamber 31 brings about a progressive recession of the rear end of the stem 34 from the corresponding contrast element 56. In this way, by virtue of the action of the corresponding spring 34', the head of the stem 34 moves back progressively into the chamber 31, with respect to the condition visible, for example, in FIGS. 4 and 5. The position of maximum recession of the stem 34 may be seen in FIGS. 14 and 15. As may be noted, in said condition the flange 34a of the stem is inserted in a corresponding seat defined on the bottom of the chamber, coaxial to the passage of the stem 32 (said seat is designated by 31f only in FIGS. 4 and 5) whilst the flange 34b of the stem is substantially flush with the supporting wall 33a of the perforating device inside the chamber 31. Conveniently, between the flange 34a and a surface of the seat 31f there can be provided a sealing element, such as an annular gasket, designed to prevent leakage of liquid towards the inside of the passage where the stem 34 slides.

Figure 14:
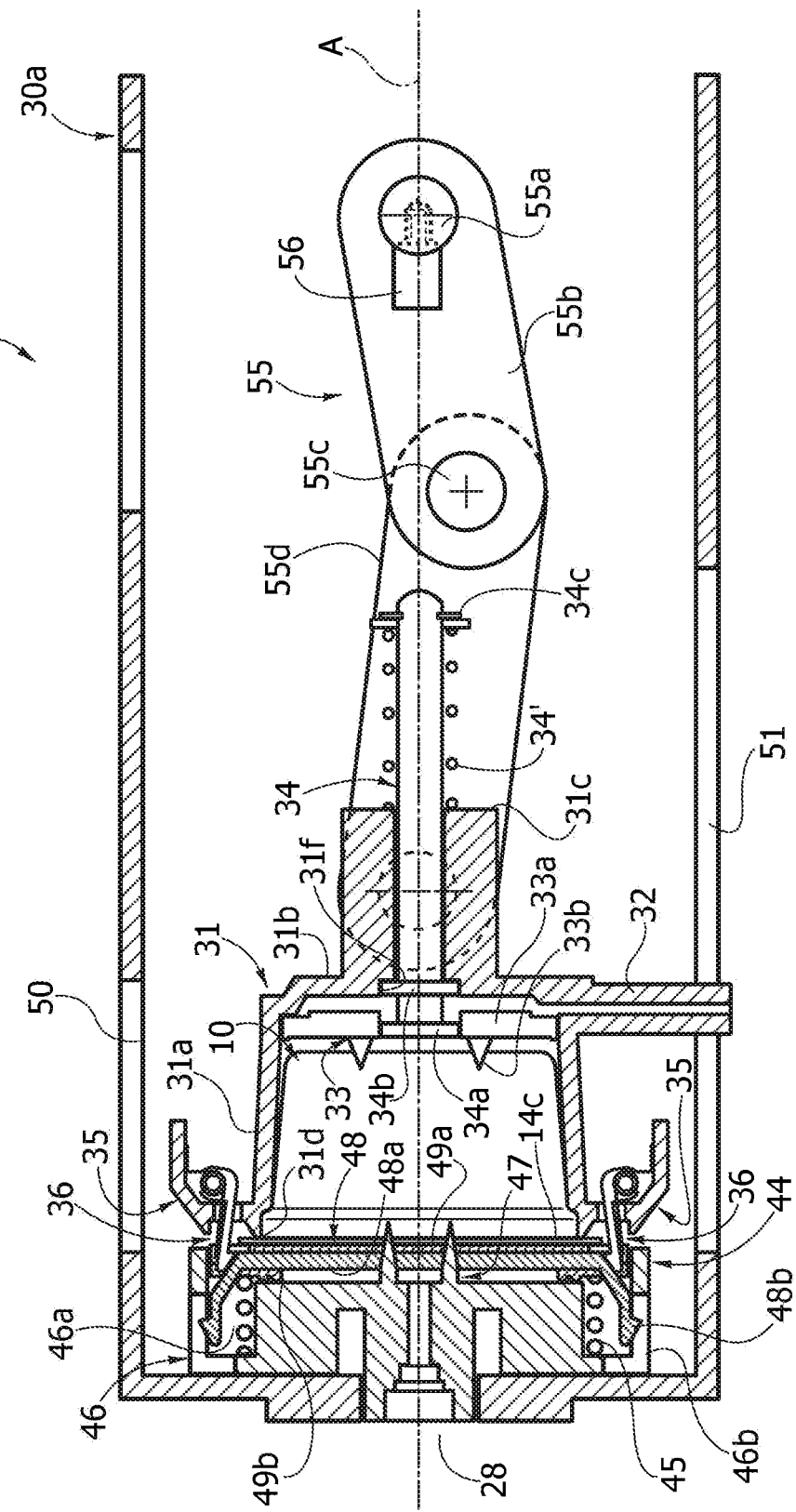
FIGS. 14 and 15 are cross-sectional views similar to those of FIGS. 4 and 5, respectively, with the delivery assembly in a condition of infusion.
Figure 15:
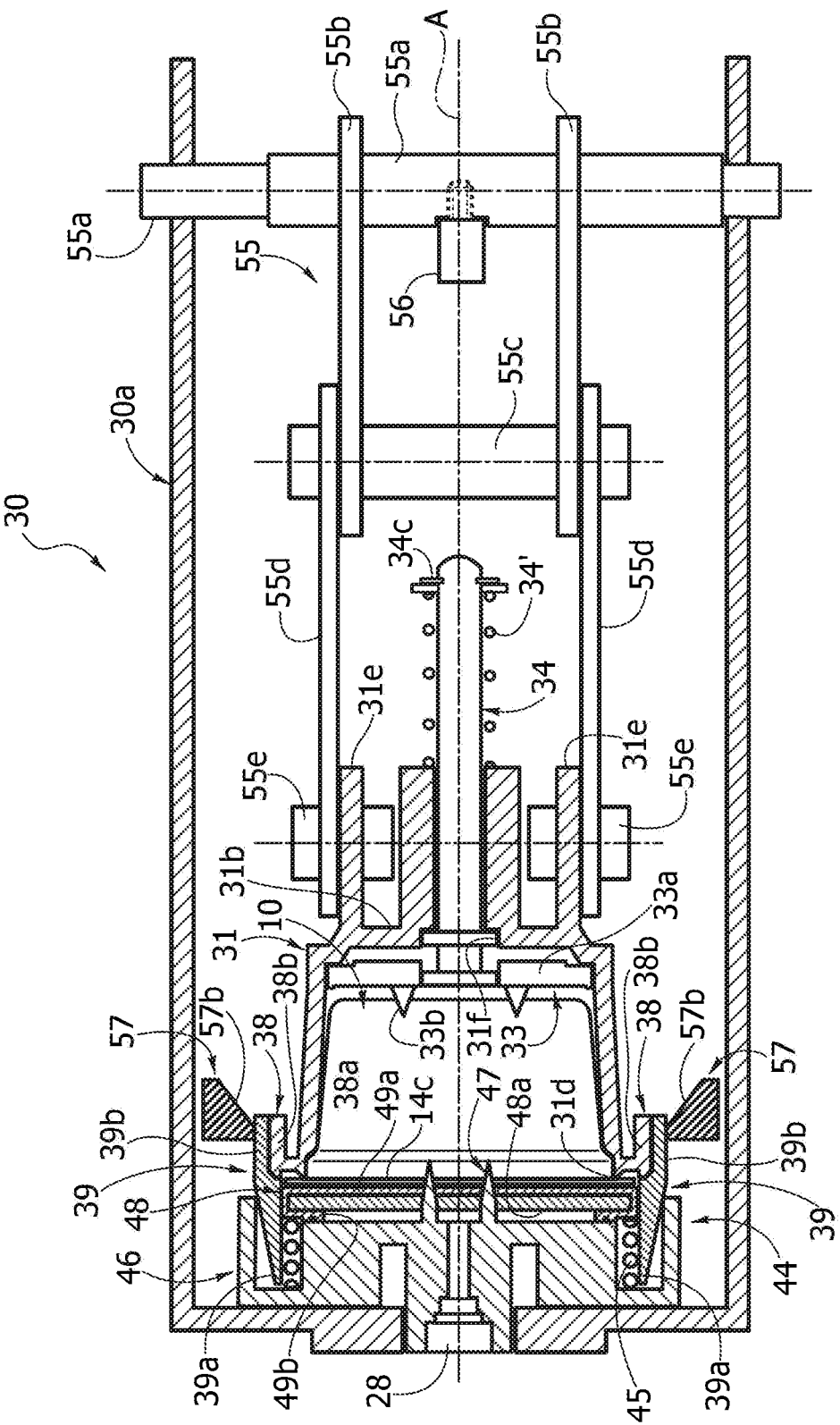

When the actuation system has been brought into the position represented in FIGS. 14-15, the pump 23 of FIG. 1 is actuated. The hot water and/or steam under pressure is thus forced into the cartridge 10 by means of the tips of the perforating device 47 to provide the infusion with the powdered product (coffee, in the example considered) contained in the cartridge 10. In this step, the front gasket 49a of the plate 48 is able to guarantee fluid tightness with respect to the sealing lamina 16 of the cartridge in the course of introduction into the latter of water and/or steam under pressure. In the case where the bottom of the cartridge 10 had already been previously perforated by the tips 33b of the first perforating device 33, the liquid product generated by the infusion can flow away through the passage 32 towards a collecting container. In other embodiments—and as has already been mentioned above—it may be envisaged, instead, that, at the start of injection of the hot water and/or steam under pressure into the cartridge 10, the bottom of the latter has not yet been perforated. In said embodiments, at a certain point subsequent to start of injection of hot water and/or steam, the pressure that is set up within the cartridge 10 causes its bottom to start to undergo deformation and be pushed against the tips of the perforating device 33, until the perforation that enables the liquid product to flow towards the duct 32 is obtained. As has been said, on the other hand, one or both of the perforating devices may not be present, in the case of pre-perforated cartridges.

The pump 23 that sends the hot water under pressure into the cartridge 10 is then deactivated, for example, manually. Next, the actuation system 55 is operated to bring the chamber 31 back into the initial position of FIGS. 4 and 5.

With recession of the bowl 31 there is obtained a sliding of the wedge-shaped elements 39 with respect to the jaws 57, which is the reverse of the one described previously, and a recession of the coupling members 36.

Shortly after start of recession, then, the teeth 36a of the coupling members 36 come back into contact with the front part of the flange of the cartridge 10 (i.e., its part covered by the lamina 16). Following upon said engagement, then, and proceeding with recession of the chamber 31, the lamina of the cartridge is released from the tips of the perforating device 47 of the injector 44—when said device 47 is present or in any case progressively moved back with respect to the body of the injector, accompanied, in this, by the plate 48 owing to the action of the corresponding spring 45.

In the case where the cartridge 10 had remained firmly fitted, with interference, in the chamber 31, recession of the latter in any case causes progressive recession of the cartridge from the injector.

In this step, the jaws 57 are again held in a divaricated condition by the inclined surface 39a of the wedge-shaped elements 39 borne by the chamber 39. In this way, the flange 14c of the exhausted cartridge cannot be withheld by the jaws 57. In practice, then, the arrangement is such that, when upon ceasing of the action of divarication exerted by the wedge-shaped elements 39 the jaws 57 close again, the jaws themselves have already been preceded in recession by the flange of the cartridge.

At a certain point of recession of the chamber 31, the rear end of the stem 34 comes back into contact with the corresponding fixed contrast element 56. In this way, as the chamber 31 continues to move back, the front end of the stem 34 presses on the bottom of the cartridge 10, pushing it out of the bowl 31, thereby also causing extraction of the tips 33*b* of the first perforating device 33 from the bottom of the exhausted cartridge, when said perforating device is present. The thrust exerted in this way by the stem 34 on the bottom of the cartridge 10 is such as to overcome in any case also the possible mechanical interference referred to previously, between the body of the cartridge and the inner surface of the chamber 31, as well as between the possible tips 33*b* and the bottom of the cartridge. In the course of recession of the chamber 31 (and hence of controlled advance of the cartridge therein, thanks to the action of the stem 34), the flange 14*c* of the cartridge is pressed against the step of the teeth 36*a*, until it causes divarication of the coupling member 36, which can then re-close after the flange has advanced beyond said teeth. Said step is represented schematically in FIG. 16.

Figure 16:
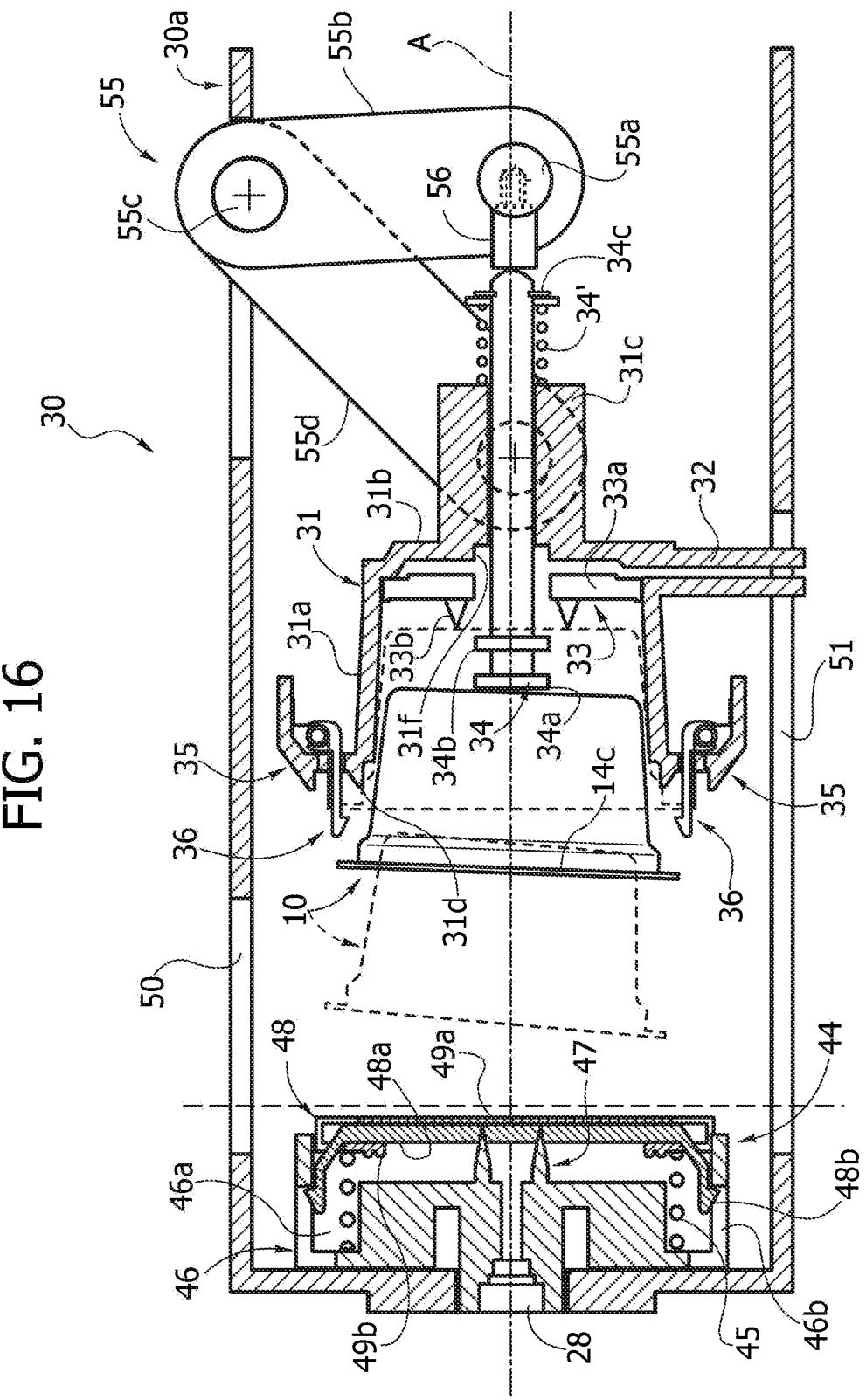
FIG. 16 is a cross-sectional view similar to that of FIG. 4, with the delivery assembly in a condition of expulsion of a cartridge.

When the flange 14*c* is no longer stopped by the members 36, the exhausted cartridge can substantially reach the condition appearing in the left-hand hatched part in FIG. 16, where the cartridge itself is located in a position suitable for dropping towards the underlying outlet passage 51. In order to favour expulsion of the type represented by the aforesaid hatched part, in the coupling member 36 represented at the bottom in the figure, the step defined by the respective tooth 36*a* can be advantageously less pronounced with respect to that of the upper coupling member.

The assembly 30 has thus returned to the initial condition of FIGS. 4 and 5, ready to receive a new cartridge 10.

Without prejudice to the principle of the invention, the details of construction and the embodiments may vary, even significantly, with respect to what has been illustrated herein purely by way of non-limiting example, without thereby departing from the scope of the invention, as defined by the annexed claims.

As already pointed out, the perforation of the bottom wall 14*b*, instead of occurring following upon introduction of water and/or steam into the cartridge 10, can also intervene "cold" following upon an action of perforation by the tips of the bottom perforating device, before, together with, or after perforation of the sealing lamina 16 by the tips 47*a* of the front perforating device, even before inflow of fluid into the cartridge 10 occurs.

As already mentioned, the cartridges that can be used in the machine according to the invention can also be of the type where the bottom of the corresponding body has one or more pre-formed passages, which are also closed by a film designed to tear once a given pressure of water and/or steam in the cartridge itself is reached.

The reciprocating displacement of the chamber 31 according to the arrow F1 can be obtained according to any modality known in the sector, for example, using a system actuated by a suitable electromechanical or hydraulic actuator.

The contrast element 56 that determines the movement of the stem 34 can be associated to any other stationary or movable part of the assembly 30 or of the machine 20, provided that it does not interfere with the actuation system used and provided that, in the course of the step of recession of the chamber 31, it is located in a position such as to provide an arrest for the stem.

It will moreover be appreciated that, in accordance with possible embodiments (not represented), the stem 34 can be in a fixed position with respect to the structure 30*a*, or not movable together with the chamber 31.

The elastic means which bias the coupling member 36 towards the corresponding closed position could include the intrinsic elasticity of the material forming the same members—for example a plastic material—for allowing a divarication thereof, and thus also without the aid of dedicated springs; for such a case, the members 36 can also be formed integrally with the body of the capsule-holder, for instance in lieu of the projections 35. Thus, members 36 can be prearranged in such a way that their closed position is obtained upon absence of any elastic biasing: in such a case, presence of possible elastic means (spring and/or intrinsic elasticity of the forming material) is exploited for enabling an opening or divarication of the members and their subsequent return to the closed position. Similar consideration can be made in connection to the elastic means for the side jaws 57.

The invention claimed is:

1. A delivery assembly for a machine for preparing liquid products by means of cartridges that have a substantially cup-shaped body that houses an amount of at least one substance capable of forming a liquid product via water and/or steam, the delivery assembly having a substantially horizontal axis and including:
    an injector device, capable to introduce into a cartridge water and/or steam under pressure;
    an infusion chamber facing the injector device and capable to receive one said cartridge;
    an actuation system, capable to cause displacements of the infusion chamber between a spaced position and a close position with respect to the injector device,
    the delivery assembly also comprising a loading arrangement that includes an inlet passage and retention means, wherein the inlet passage is capable of enabling insertion of a cartridge into the delivery assembly and the retention means are capable of maintaining the cartridge in a position substantially coaxial to the infusion chamber and to the injector device,
    wherein the retention means are switchable between a retention condition and a release condition of the cartridge by means of said displacements of the infusion chamber with respect to the injector device,
    wherein the delivery assembly further comprises ejector means, which are functionally distinct from said retention means and capable to push the cartridge towards the outside of the infusion chamber in function of the displacement of the infusion chamber towards its spaced position with respect to the injector device,
    and wherein the delivery assembly also comprises coupling means borne by the infusion chamber, the coupling means being capable of assuming a condition of engagement and a condition of disengagement with respect to a cartridge in the course of the displacement of the infusion chamber towards said close position and towards said spaced position, respectively.

2. The delivery assembly according to claim 1, wherein the ejector means comprise a longitudinally extended ejector member and wherein the infusion chamber is displaceable relative to the ejector member.

3. The delivery assembly according to claim 2, wherein the ejector member is slidably received in a through opening of a bottom of the infusion chamber and has one leading end capable to interfere with the bottom of the cartridge when the cartridge is at least partially inserted in the infusion chamber, and wherein the ejector member is configured in such a way that said leading end is capable of assuming, with respect to the bottom of the infusion chamber, a withdrawn position and a forward position, the passage from the withdrawn position to the forward, and vice versa, being caused by the displacement of the infusion chamber from said close position to said spaced position, and vice versa.

4. The delivery assembly according to claim 3, wherein the ejector member is biased by elastic means towards the respective withdrawn position.

5. The delivery assembly according to claim 3, wherein the ejector member is borne by the infusion chamber and is mounted displaceable thereon, and wherein the ejector means comprise an element on which one end of the ejector member opposite to said leading end is capable of abutting in the course of the displacement of the infusion chamber from said close position to said spaced position.

6. The delivery assembly according to claim 3, wherein the ejector member is mounted in a fixed position or not movable together with the infusion chamber.

7. The delivery assembly according to claim 1, wherein the coupling means, in the respective condition of engagement, are capable of exerting a traction on the cartridge in the course of the displacement of the infusion chamber towards its spaced position with respect to the injector device.

8. The delivery assembly according to claim 7, wherein the coupling means are switchable from the condition of engagement to the condition of disengagement when the cartridge is pushed towards the outside of the infusion chamber by means of the ejector means, in the condition of disengagement the cartridge being free to fall towards an outlet passage of the delivery assembly.

9. The delivery assembly according to claim 1, wherein the retention means are switchable from said condition of retention to said condition of release by means of a mechanical interaction or interference therewith of corresponding parts fixed to or integral with the infusion chamber.

10. The delivery assembly according to claim 9, wherein the retention means comprise two jaw members mounted so that they can oscillate according to respective axes parallel to the axis of the delivery assembly, the jaw members being biased by elastic means towards said condition of retention.

11. The delivery assembly according to claim 1, wherein the coupling means comprise two jaw members mounted so that they can oscillate and can be elastically biased towards said condition of engagement, the jaw members being in particular each hinged to a pin substantially perpendicular to the axis of the delivery assembly, each jaw member extending in length in a direction generally perpendicular to the respective pin.

12. The delivery assembly according to claim 11, wherein the jaw members each have one end including at least one inclined plane generally facing the axis of the delivery assembly and capable to interact with an edge of the body of the cartridge.

13. The delivery assembly according to claim 1, wherein the actuation system is a manually driven actuation system.

14. A machine for preparing liquid products via cartridges, comprising a delivery assembly according to claim 1.

15. A system for preparing a liquid product, comprising
a machine which includes a delivery assembly according to claim 1, and
a cartridge containing a dose of at least one substance capable of forming a liquid product via water and/or steam, the cartridge having a cartridge body that comprises a side wall, a bottom wall closing the cartridge body at a first end of the side wall and an upper wall closing the cartridge body at the second end of the side wall.

16. A method for preparing a liquid product comprising the steps of:
providing a machine for preparing liquid products which comprises a delivery assembly according to claim 1;
providing a cartridge containing a dose of at least one substance capable of forming a liquid product via water and/or steam, the cartridge having a cartridge body that comprises a side wall, a bottom wall closing the cartridge body at a first end of the side wall and an upper wall closing the cartridge body at the second end of the side wall;
inserting the cartridge in the delivery assembly when the infusion chamber is in said spaced position, in such a way that retention means retains the cartridge in said position substantially coaxial to the infusion chamber and to the injector device;
actuating the actuation system for bringing the infusion chamber in said close position,
with the infusion chamber in said close position, injecting via the injector device water and/or steam in the cartridge for preparing the liquid product, and dispensing the liquid product from the infusion chamber;
bringing the infusion chamber back to said spaced position, wherein during displacement of the infusion chamber from the close position to the spaced position, the coupling means in a corresponding condition of engagement exert a traction on the cartridge and are subsequently switched in a corresponding condition of disengagement when the cartridge is pushed towards the outside of the infusion chamber by the ejector means.

* * * * *